(12) United States Patent
Scot et al.

(10) Patent No.: US 11,599,242 B2
(45) Date of Patent: Mar. 7, 2023

(54) CONTEXT-SENSITIVE USER INTERFACE SHORTCUTS FOR A WEARABLE DEVICE

(71) Applicant: Bank of America Corporation, Charlotte, NC (US)

(72) Inventors: Richard Martin Seymour Scot, Huntersville, NC (US); Naga Vamsi Krishna Akkapeddi, Charlotte, NC (US); Siten Sanghvi, Westfield, NJ (US); Pratap Dande, Saint Johns, FL (US); Stephen T. Shannon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/339,489

(22) Filed: Jun. 4, 2021

(65) Prior Publication Data
US 2022/0391048 A1 Dec. 8, 2022

(51) Int. Cl.
*H04W 12/06* (2021.01)
*G06F 3/0482* (2013.01)
*H04W 12/63* (2021.01)

(52) U.S. Cl.
CPC .......... *G06F 3/0482* (2013.01); *H04W 12/06* (2013.01); *H04W 12/63* (2021.01)

(58) Field of Classification Search
CPC ...... G06F 3/0482; H04W 12/63; H04W 12/06
See application file for complete search history.

(56) References Cited

U.S. PATENT DOCUMENTS

| | | | |
|---|---|---|---|
| 10,657,535 B1* | 5/2020 | Yaqub | G06Q 20/401 |
| 10,991,006 B2* | 4/2021 | Murthy | G06Q 30/0261 |
| 11,461,796 B1* | 10/2022 | Donels | G06Q 30/0239 |
| 2007/0156677 A1 | 7/2007 | Szabo | |
| 2010/0082490 A1 | 4/2010 | Rosenblatt et al. | |
| 2010/0100470 A1 | 4/2010 | Buchanan et al. | |
| 2012/0036016 A1 | 2/2012 | Hoffberg et al. | |
| 2012/0130893 A1 | 5/2012 | Evans | |
| 2013/0030925 A1 | 1/2013 | Calman et al. | |
| 2013/0325681 A1 | 12/2013 | Somashekar et al. | |
| 2015/0348083 A1 | 12/2015 | Brill et al. | |
| 2016/0055512 A1* | 2/2016 | Godsey | G06Q 20/325 705/14.27 |
| 2016/0086222 A1 | 3/2016 | Kurapati | |
| 2016/0210491 A9 | 7/2016 | Rosenblatt et al. | |
| 2016/0225108 A1 | 8/2016 | Fishberg | |
| 2017/0068421 A1* | 3/2017 | Carlson | G06F 3/04817 |
| 2017/0155631 A1 | 6/2017 | Du | |

(Continued)

*Primary Examiner* — Beau D Spratt

(57) ABSTRACT

According to certain embodiments, a wearable device comprises a memory operable to store menus comprising menu options, and a processor operably coupled to a network interface and the memory. The processor is configured to present a first menu comprising a first menu option associated with a data processing transaction available at a current location, determine an updated location, obtain a second menu comprising a second menu option associated with a data processing transaction available at the updated location, and present the second menu. The processor is further configured to receive user input indicating a selection of the second menu option and facilitate the data processing transaction available at the updated location based on the selection.

17 Claims, 2 Drawing Sheets

(56) References Cited

U.S. PATENT DOCUMENTS

| | | |
|---|---|---|
| 2017/0255793 A1 | 9/2017 | Caldwell |
| 2017/0374414 A1 | 12/2017 | Knox |
| 2018/0011533 A9 | 1/2018 | Marggraff et al. |
| 2018/0033045 A1 | 2/2018 | Flynn |
| 2019/0187870 A1 | 6/2019 | Bostick et al. |
| 2019/0215796 A1 | 7/2019 | Poosamani et al. |
| 2020/0019292 A1 | 1/2020 | Monte |
| 2020/0042087 A1 | 2/2020 | Ang et al. |
| 2020/0042966 A1 | 2/2020 | Deluca et al. |
| 2020/0051100 A1 | 2/2020 | Jones-Mcfadden et al. |
| 2020/0074565 A1 | 3/2020 | Dotter |
| 2020/0088463 A1 | 3/2020 | Jeong et al. |
| 2020/0167841 A1 | 5/2020 | Caldwell |
| 2020/0169837 A1 | 5/2020 | Iqbal et al. |
| 2020/0186960 A1* | 6/2020 | Nolan ................ G06Q 30/0259 |
| 2020/0193443 A1 | 6/2020 | Piel |
| 2020/0249819 A1 | 8/2020 | Berquam et al. |
| 2020/0294530 A1 | 9/2020 | Cella |
| 2020/0342550 A1 | 10/2020 | Halimsaputera |
| 2020/0364588 A1 | 11/2020 | Knox |
| 2021/0021305 A1 | 1/2021 | Rule et al. |
| 2021/0042830 A1 | 2/2021 | Burke |
| 2021/0049514 A1 | 2/2021 | Neumann |
| 2021/0049703 A1 | 2/2021 | Ciaglia et al. |
| 2021/0067202 A1 | 3/2021 | Rule et al. |
| 2021/0081377 A1 | 3/2021 | Polleri et al. |
| 2021/0081836 A1 | 3/2021 | Polleri et al. |
| 2021/0081837 A1 | 3/2021 | Polleri et al. |
| 2021/0090731 A1 | 3/2021 | Mayou et al. |
| 2021/0092219 A1 | 3/2021 | Hwang et al. |
| 2021/0124422 A1 | 4/2021 | Forsland |
| 2021/0160230 A1 | 5/2021 | Du |

\* cited by examiner

CONTEXT-SENSITIVE USER INTERFACE SHORTCUTS FOR A WEARABLE DEVICE

TECHNICAL FIELD

Certain embodiments of the present disclosure relate generally to determining user interface shortcuts for a wearable device. For example, certain embodiments determine user interface shortcuts adapted to accommodate technical constraints of the wearable device, such as technical constraints associated with display screen dimensions, processing capacity, memory capacity, and/or power consumption constraints.

BACKGROUND

A wearable device is a computing device that can be worn by a user. Certain wearable devices may be for general use. For example, in some cases, a wearable device may be mobile computing device that is particularly small in size. In some cases, a wearable device may be for a specialized purpose. Some wearable devices may include special sensors such as accelerometers, location sensors, thermometers, heart rate monitors, and/or other sensors. Examples of wearable devices may include computing devices worn on the wrist (such as a smartwatch), hung from the neck (like a necklace), strapped to the arm or leg, worn on the head (such as glasses, headphones, or a helmet), or worn elsewhere on the user or the user's clothing. Mobile computing devices that can be carried in a pocket or bag, such as smartphones or tablets, can also be considered wearable devices. In order for a device to be wearable (e.g., to be a wearable size, to support mobility, etc.), the wearable device may be subject to various technical constraints related to battery life, heat dissipation, processing capacity, memory capacity, software architecture, network connectivity, data management, and/or other constraints.

SUMMARY

The wearable device disclosed in the present application provides a technical solution to the technical problems. For context, wearable devices are often small in size so that they can be easily worn by a user. As an example, a wearable smartwatch may commonly have a face size smaller than two-by-two inches. To accommodate the small size, a wearable device may be subject to certain technical constraints, for example, in terms of display screen dimensions, processing capacity, memory capacity, power consumption, etc. The technical constraints associated with a wearable device present certain challenges. For example, it may not be practical for a wearable device to present a complex user interface, such as a web page with a complex navigational structure (e.g., numerous menu options, links, graphics, and/or other details).

The wearable device disclosed in the present application provides a technical solution to the technical problems discussed above by leveraging context-sensitive shortcuts to facilitate determining which of a plurality of menus to present via a graphical user interface of the wearable device. The disclosed wearable device provides several practical applications and technical advantages which include a process for dynamically updating menu options presented via the graphical user interface based on changes in context information, such as changes in a location of the wearable device or changes in a user profile or a user pattern used to customize the menu options. More specifically, this process allows a wearable device to present a first menu a first menu comprising a first menu option associated with a data processing transaction available at a current location, determine an updated location, obtain a second menu comprising a second menu option associated with a data processing transaction available at the updated location, and present the second menu. Existing techniques are typically limited to a fixed menu structure that arranges menu options in a predetermined structure. In contrast, certain embodiments of the disclosed process use machine learning to dynamically update the shortcuts, for example, based on a user profile or user patterns, so that the wearable device presents the menu options with a relatively high likelihood of being selected by the user.

This process provides a practical application by determining menu options to present to a user based on shortcuts that simplify navigating the user interface of the wearable device and/or accommodate the display screen dimensions of a wearable device, thereby improving the wearable device's ability to efficiently facilitate a data processing transaction. In certain embodiments, the shortcuts allow for reducing the amount of information to be presented by the user interface, which may in turn yield technical advantages such as reducing the amount of time it takes the wearable device to present the information on the user interface, conserving processing capacity, memory capacity, and/or power that would otherwise be used in the absence of the shortcuts, and/or facilitating better user responsiveness.

According to certain embodiments, a wireless device comprises a memory operable to store one or more menus, each menu comprising one or more menu options, and a processor operably coupled to a network interface and the memory. The processor is configured to present a first menu of the one or more menus via a graphical user interface of the wearable device. The first menu comprises one or more first menu options, the one or more first menu options associated with one or more data processing transactions available at a current location of the wearable device. The processor is further configured to determine an updated location of the wearable device and obtain a second menu of the one or more menus, the second menu is associated with the updated location of the wearable device. The second menu comprises one or more second menu options, the one or more second menu options associated with one or more data processing transactions available at the updated location of the wearable device. The processor is further configured to present the second menu via the graphical user interface of the wearable device, receive user input indicating a selection of at least one of the one or more second menu options, and facilitate at least one of the data processing transactions available at the updated location of the wearable device based on the selection.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION

For a more complete understanding of the present disclosure and for further features and advantages thereof, reference is now made to the following description taken in conjunction with the accompanying example drawings, in which.

DETAILED DESCRIPTION

Figure 1:
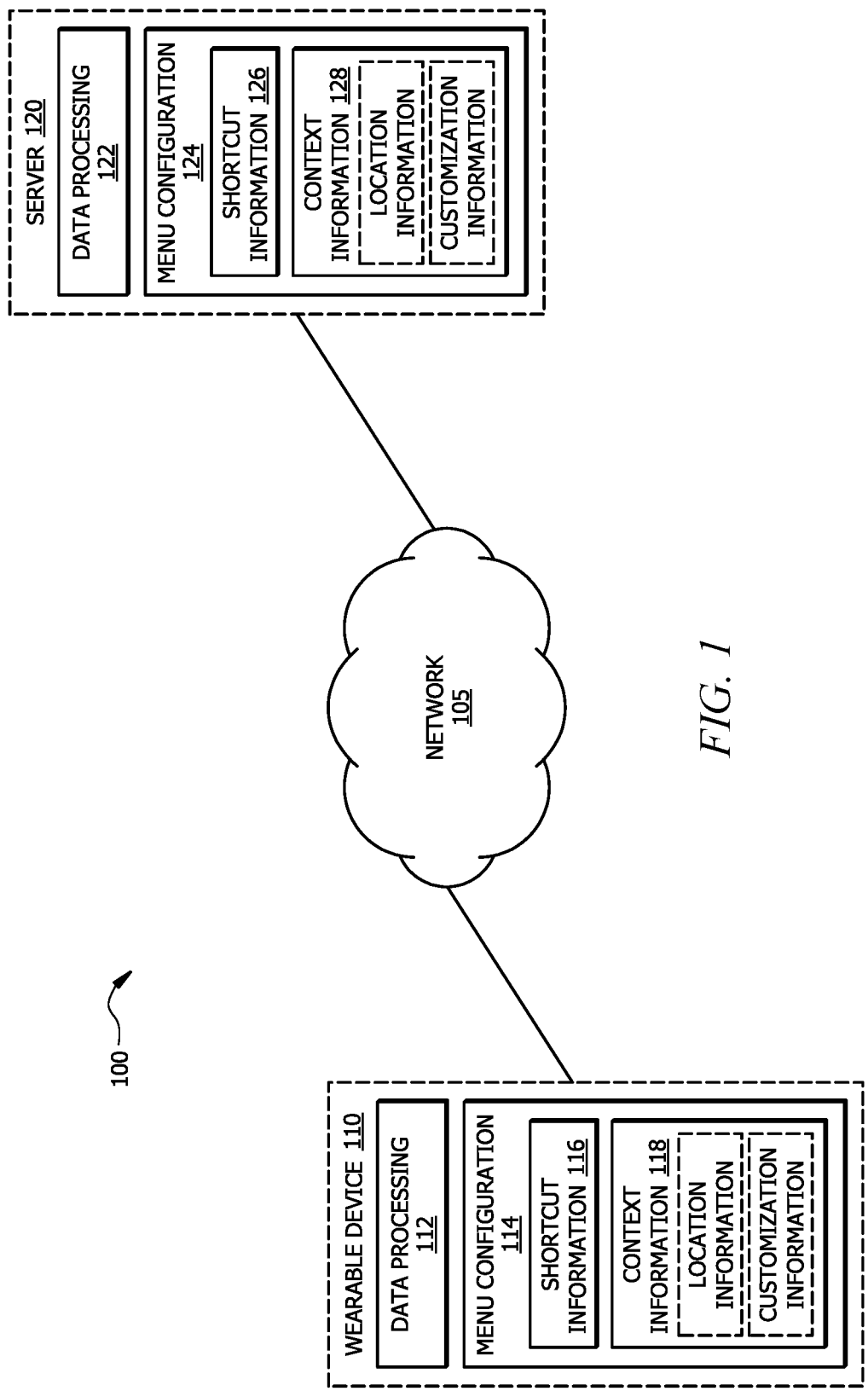
FIG. 1 illustrates an example of a system, in accordance with certain embodiments.
Figure 2:
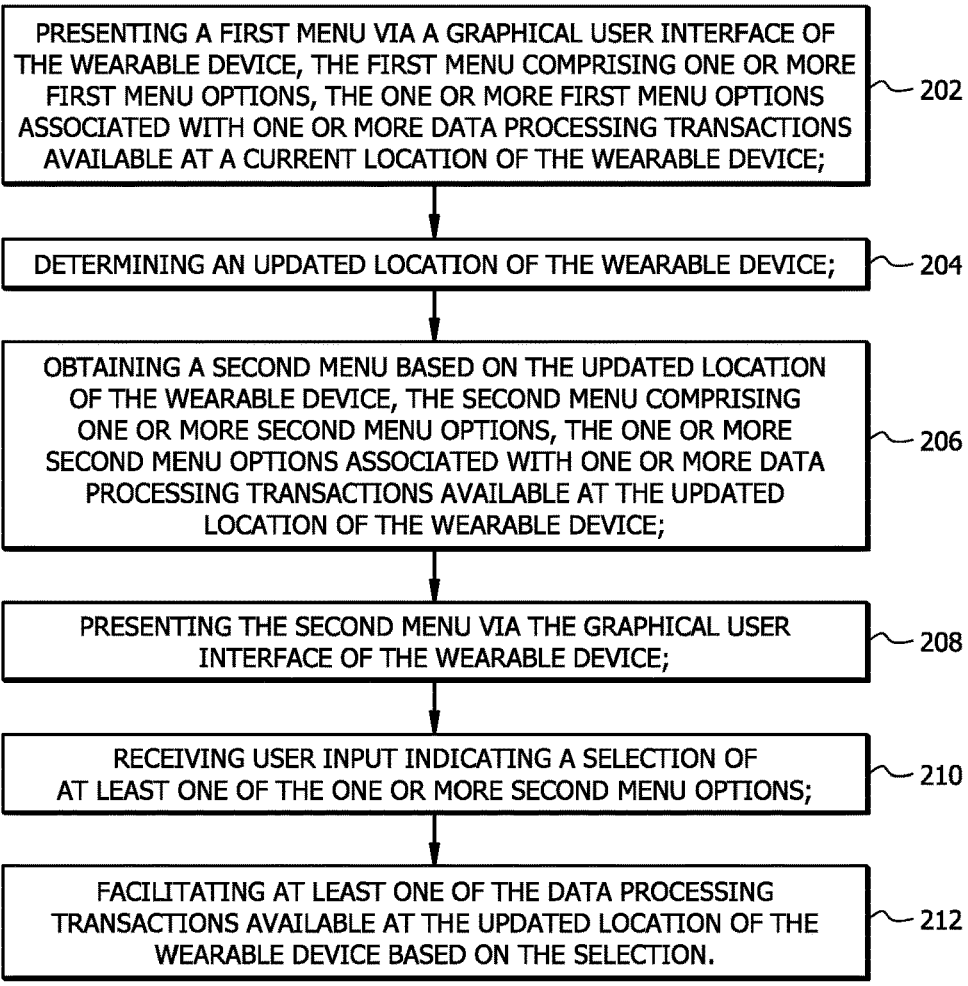
FIG. 2 illustrates an example of a method, in accordance with certain embodiments.
Figure 3:
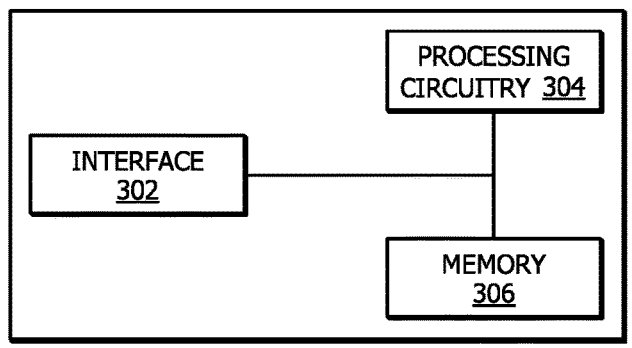
FIG. 3 illustrates an example of computing components, in accordance with certain embodiments.

Certain embodiments of the present disclosure may be implemented in accordance with one or more of FIGS. 1-3, like numerals used to describe like components of the various figures. FIG. 1 illustrates an example of system 100, in accordance with certain embodiments. According to certain embodiments, system 100 comprises a network 105 that communicatively couples one or more wearable devices 110 and one or more servers 120. In general, wearable device 110 presents menus to a user via a graphical user interface of wearable device 110. Each menu may comprise one or more menu options. A user may select a menu option to cause the wireless device to facilitate a data processing transaction associated with the selected menu option. In certain embodiments, the menus presented to the user may be context-sensitive. Thus, wearable device 110 may dynamically update the menus in response to updated context information. Server 120 may support the functionality of wearable device 110, for example, by providing menus, by providing context information that wearable device 110 may use to generate menus, and/or by performing data processing transactions, as further described below.

Wearable device 110 generally refers to a computing device that can be worn by a user and used by the user to interact with server 120 via network 105. Examples of wearable device 110 may include computing devices worn on the wrist (such as a smartwatch), hung from the neck (like a necklace), strapped to the arm or leg, worn on the head (such as glasses, headphones, or a helmet), worn elsewhere on the user or the user's clothing, or carried in a pocket or bag, such as smartphones or tablets. Wearable device 110 may include any suitable input and/or output devices for interacting with the user. As an example, wearable device 110 may request input from a user by displaying menu options using a graphical user interface. In general, the menu options may be adapted based on the technical constraints of wearable device 110. For example, the menu options may be streamlined such that each menu option fits within the dimensions of the graphical user interface. As another example, the menu options may be arranged according to a simplified navigational structure. The navigational structure may use shortcuts to determine which menu options to present to the user. The shortcuts can reduce the amount of menu options that the user has to view and respond to. In certain embodiments, the shortcuts may facilitate automating certain data processing transactions. The user may select one of the menu options, for example, using a touchscreen input of wearable device 110's graphical user interface. Wearable device 110 may output a response to the user, for example, via the graphical user interface.

In the example depicted in FIG. 1, wearable device comprises a data processing engine 112 and a menu configuration engine 114. Data processing engine 112 facilitates data processing transactions. For example, data processing engine 112 may receive a request for a data processing transaction from the user via an input (such as a touchscreen input of wearable device 110) and may communicate the request via network 105 to a server 120 configured to perform the data processing transaction. In certain embodiments, server 120 may communicate a response to data processing engine 112 via network 105. The response may indicate whether the data processing transaction was successful or unsuccessful, or whether server 120 requires further authentication and/or further information to proceed with the data processing transaction. Data processing engine 112 may facilitate presenting the response to the user via the graphical user interface. In certain embodiments, presenting the response may include obtaining menu options associated with the response from menu configuration engine 114.

Menu configuration engine 114 obtains menus to be presented to the user via the graphical user interface of wearable device 110. Menu configuration engine 114 may obtain the menus and/or menu options for the menus in any suitable manner. For example, in certain embodiments, wearable device 110 may retrieve one or more menus or menu options from memory, wearable device 110 may generate one or more menus or menu options using processing circuitry, and/or wearable device 110 may receive one or more menus or menu options from server 120 via network 105.

In certain embodiments, menu configuration engine 114 includes shortcut information 116 associated with one or more pre-defined shortcuts. In general, a pre-defined shortcut may facilitate streamlining or simplifying a menu structure presented by wearable device 110. In certain embodiments, a pre-defined shortcut comprises one or more menu options. The pre-defined shortcut may be associated with and one or more conditions (such as context-sensitive conditions) indicating when to apply the pre-defined shortcut. In certain embodiments, the pre-defined shortcut may be configured in advance by a user. For example, the user may configure a pre-defined shortcut to be stored in memory of wearable device 110. Wearable device 110 may then retrieve and apply the pre-defined shortcut in response to detecting the one or more conditions associated with the pre-defined shortcut. As another example, the user may configure the pre-defined shortcut to be stored in memory of server 120. Server 120 may detect the one or more conditions associated with the pre-defined shortcut and may then communicate the pre-defined shortcut to menu configuration engine 114 for presentation to the user. In addition, or in the alternative, wearable device 110 and/or server 120 may determine one or more pre-defined shortcuts based on machine learning. In addition, or in the alternative, a system administrator may configure server 120 with one or more pre-defined shortcuts, and server 120 may communication the one or more pre-defined shortcuts to wearable device 110 (for example, in response to detecting the one or more conditions associated with the pre-defined shortcuts).

In certain embodiments, a pre-defined shortcut may facilitate automating a data processing transaction. As an example, suppose a pre-defined shortcut comprises a menu related to paying a bill. Examples of menu options may include an option to proceed with paying the bill and an option not to pay the bill (for example, if the user would like to review the bill more closely when convenient for the user). The menu options may optionally provide further granularity, for example, based on settings that the user opts to configure, such as menu options for selecting which of the user's financial accounts to use to pay the bill, whether to pay the bill immediately or after X number days, whether to pay a minimum balance or the full amount, etc. In certain embodiments, server 120 may indicate to wearable device 110 when a new bill has been received. Wearable device 110 may then notify the user of the new bill and may present the user with menu options associated with the pre-defined shortcut (which wearable device 110 may obtain from server 120 or from memory of wearable device 110, for example). The user may select a menu option to pay the bill. Wearable device may then facilitate a data processing transaction, for example, by sending server 120 a request to proceed with paying the bill according to the selected menu option.

In certain embodiments, menu configuration engine 114 includes context information 118. Examples of context information include location information and/or customization information. Location information may indicate whether a data processing transaction is available or unavailable at a particular location. Thus, when wearable device 110 is located in the particular location, menu configuration engine 114 may cause wearable device 110 to present menus and/or menu options associated with available data processing transactions (and to omit menus and/or menu options associated with unavailable data processing transactions). In certain embodiments, customization information comprises information customized to the user, for example, based on user history or user patterns. In certain embodiments, the customization information may be obtained from server 120. Menu configuration engine 114 may use the customization information to customize the menus and/or menu options to the user.

Server 120 generally refers to hardware and/or software capable of communicating with wearable device 110 via network 105. Examples of a server 120 may comprise one or more cloud-based servers, file servers, web servers, data centers, virtual machines, mainframe computers, etc. In certain embodiments, server 120 is associated with an enterprise. As an example, the enterprise could be a business that facilitates data processing transactions on behalf of users. In an embodiment, the enterprise may be a financial institution and the data processing transaction may process a financial transaction, such as a bill payment, withdrawal of funds from a financial account, etc.

In certain embodiments, server 120 comprises a data processing engine 122 operable to facilitate the data processing transaction. For example, data processing engine 122 may receive a request for a data processing transaction from wearable device 110 and may perform the data processing transaction. In certain embodiments, server 120 comprises a menu configuration engine 124. As described above, in certain embodiments, wearable device 110 may receive menu-related information from server 120 (such as one or more menus, one or more menu options, one or more pre-defined shortcuts, and/or customization information that wearable device 110 may use to generate menus). Thus, sever 120's menu configuration engine 124 may prepare the menu-related information and communicate the menu-related information to wearable device 110. Menu configuration engine 124 may include shortcut information 126 and/or context information 128 (e.g., location information and/or customization information) to facilitate preparing and communicating the menu-related information to wearable device 110.

Network 105 represents any suitable network(s) operable to facilitate communication between wearable device(s) 110, server(s) 120, and/or representative device(s) 130. Network 105 may include any interconnecting system capable of transmitting audio, video, signals, data, messages, or any combination of the preceding. Network 105 may include all or a portion of a public switched telephone network (PSTN), a cellular network, a base station, a gateway, a public or private data network, a local area network (LAN), a metropolitan area network (MAN), a wide area network (WAN), a wireless WAN (WWAN), a local, regional, or global communication or computer network, such as the Internet, a wireline or wireless network, an enterprise intranet, or any other suitable communication link, including combinations thereof, operable to facilitate communication between the components.

For purposes of example and explanation, FIG. 1 depicts the network as including certain components. However, this disclosure recognizes that the network may include any suitable components. One of ordinary skill in the art will appreciate that certain components can be omitted and other components not mentioned herein can be added. Additionally, components can be integrated or separated in any suitable manner. Similarly, functionality can be distributed or localized in any suitable manner.

In certain embodiments, system 100 may allow a user to use software (such as an app) running on the user's wearable device 110 to configure one or more pre-defined shortcuts (such as hotkeys) on wearable device 110. In addition, or in the alternative, one or more pre-defined shortcuts may be configured independently of the user, for example, based on input from server 120, a system administrator, machine learning, etc. As an example, a wearable device 110 may be configured with some standard pre-defined shortcuts that do not need to be setup by the user, and the user may setup additional pre-defined shortcuts if the user wants to do so. The pre-defined shortcuts allow the user to automate data processing transactions or other actions. As an example, in certain embodiments, a pre-defined shortcut may allow the user to automatically initiate payment of a bill in response to a wearable device 110 displaying a pop-up notification that notifies the user that the bill is due to be paid. The pop-up notification may be initiated in any suitable manner. In an embodiment, wearable device 110 detects that a new bill has arrived in the user's email and, in response, wearable device 110 displays the pop-up notification with bill pay menu options for that bill. In another embodiment, server 120 detects a regularly recurring bill (such as a phone bill that the user pays on the $15^{th}$ of every month), and server 120 sends wearable device 110 an indication to display the pop-up notification with bill pay menu options to pay the regularly recurring bill. In this manner, the user may efficiently pay bills from wearable device 110 without having to login to a bill pay website that may otherwise require the user to navigate the website's menu structure for locating and paying the bill.

Certain embodiments dynamically determine which pre-defined shortcut to apply based on context information, such as location information. In this manner, wearable device 110 presents menus and menu options relevant to data transactions available in the current context. Wearable device 110 omits menus and menu options specific to data transactions that are unavailable in the current context, which streamlines and simplifies the menu structure. Streamlining the menu structure may accommodate the technical constraints of wearable device 110, for example, by limiting the amount of information to be displayed by wearable device 110 (which may have a small screen size).

In certain embodiments, wearable device 110 includes location capabilities, such as global positioning system (GPS) capabilities. Location information may be used to determine where wearable device 110 is located and to dynamically change menus based on the data transactions available at the current location.

As an example, certain menu options may be available when wearable device 110 is within a pre-determined proximity of a site. In an embodiment, the site may be an ATM machine, and wearable device 110 may be configured to present menu options to withdraw funds from the ATM machine if the user is within a certain proximity (such as within 10 feet, 20 feet, 50 feet, or other suitable distance) of the ATM machine. For example, the menu options may include an option to withdraw $20 from the ATM, and option to withdraw $40 from the ATM, and an option to withdraw $60 from the ATM. The user may select one of the options so that the withdrawal my proceed efficiently once the user reaches the ATM. In an embodiment, the user would simply insert the user's ATM card into the ATM, and the ATM would automatically dispense the amount of money that the user selected via wearable device 110 (without the user having to navigate a separate menu structure of the ATM). In certain embodiments, the ATM may authenticate the user based on information available from wearable device 110 (without requiring the user to enter a PIN or other authentication information via a separate menu structure of the ATM).

In another embodiment, the site may be a service site, such as a financial center, and wearable device 110 may be configured to be present options to facilitate obtaining a financial service when wearable device 110 is located in or near the financial center. Certain embodiments use wearable device 110 to authenticate the user so that the user can begin a conversation with the service representative, without further ado. Thus, the user and the service representative may save time that otherwise would have been spent presenting a credit card, presenting a driver's license, providing a PIN or social security number, or answering security questions.

As another example, certain menu options may be available to the user when located in the user's home city, state, or country and unavailable to the user when located outside the user's home city, state, or country. In certain embodiments, the user may pre-define the shortcuts based on menu options that the user would like to have available in certain locations. For example, wearable device 110 may include a menu that notifies the user if the user's credit card is used outside of the user's home country and presents the user with menu options to allow or decline the transaction. If the user has a trip planned to another country, the user can add a pre-defined shortcut that causes wearable device 110 to omit such menu options during the time period that the user plans to use the user's credit card outside of the user's home country. The user may remove the pre-defined shortcut after the planned trip if the user would like to resume receiving such notifications, for example, in order to detect unexpected use of the user's credit card in another country.

Certain embodiments may use context information, such as location, to determine authentication factors to be verified for a particular data processing transaction. As an example, certain embodiments may authenticate the user based on biometric information (such as fingerprint scanning, facial recognition, iris recognition, voice recognition, etc.) when the location information indicates that wearable device 110 is located in the user's home city. Certain embodiments may authenticate the user based on biometric information and at least one additional factor, such as requiring the user to input a PIN or a key or the last four digits of the user's social security number, when the location information indicates that wearable device 110 is located outside the user's home city.

Certain embodiments may remove the requirement for the at least one additional factor if a confidence level that wearable device 110 associates with the biometric data exceeds a threshold. For example, when wearable device 110 is new, the confidence level that wearable device 110 associates with the biometric data may be below the threshold (e.g., wearable device 110 is not yet familiar with the user, so wearable device 110 may have insufficient data points to confirm that the biometric data accurately identifies the user). After a period of time, the confidence level that wearable device 110 associates with the biometric data may exceed the threshold (e.g., wearable device 110 has become familiar with the user, so wearable device 110 may have sufficient data points to confirm that the biometric data accurately identifies the user).

Certain embodiments may determine authentication factors to be verified based at least in part on a type of data processing transaction. For example, certain embodiments may require fewer authentication factors for data processing transactions associated with low dollar amounts or data processing transactions associated with a recurring pattern of user behavior (e.g., such as a monthly rent payment). Certain embodiments may require more authentication factors for data processing transactions associated with high dollar amounts or data processing transactions that are not associated with a recurring pattern of user behavior.

In certain embodiments, a number of menu options may be kept small in order to accommodate a small screen size of certain wearable devices, such as certain smartwatches. Due to the small screen size, it may be impractical for wearable device 110 to present a full menu of options to the user. In certain embodiments, the pre-defined shortcuts may be used to reduce the number of menu options. In certain embodiments, machine learning may be used to determine a number of menu options to include for a particular type of data processing transaction. As an example, certain data processing transactions may use two menu options and other data processing transactions may use three menu options, depending on the type of transaction and/or the context information.

Certain embodiments dynamically determine the number and/or type of menu options. Certain embodiments may use machine learning to dynamically determine the number and/or type of menu options. Certain embodiments dynamically determine the number and/or type of menu options based on context information associated with a user profile or user pattern. In certain embodiments, machine learning may determine that a user profile has changed over time, and machine learning may update the menu options based at least in part on the changes to the user profile. In certain embodiments, machine learning may determine that a user pattern has changed over time, and machine learning may update the menu options based at least in part on the changes to the user pattern.

Examples of context information associated with a user profile or user pattern may include information indicating a user's transaction history, what tasks the user routinely performs, what tasks the user has recently performed, what type of accounts or relationships the user has with the enterprise, and/or other suitable information. As an example, suppose wearable device 110 indicates that the user is located in a financial center. Wearable device 110 may present menu options based on a user profile that indicates what type of accounts or relationships the user has with the financial institution. Wearable device 110 may obtain menu options based on the user profile from memory of wearable device 110, from server 120, or from another source. Continuing with the example, the menu option may ask the user whether the user would like service for a new account or an existing account. If the user selects an existing account, the next menu option may ask the user to select from financial accounts associated with the user's profile (such as the user's savings account and the user's credit card account).

The user may continue to interact with the menu options to help lead the user to the correct person to provide the service of interest to the user.

Certain embodiments may be tailored to a particular type of wearable device 110. For example, certain embodiments determine a number of menu options to present based at least in part on capabilities of the wearable device. As another example, certain embodiments determine authentication factors to authenticate based on the kinds of biometrics the device supports. Newer models of wearable devices 110 may include more sophisticated biometric sensors than legacy models, so certain embodiments may use biometric data to authenticate a user using a newer model wearable device 110 and may use biometric data plus at least one additional factor to authenticate a user using a legacy model wearable device 110.

Certain embodiments integrate dynamic generation of menus for wearable device 110 into an ecosystem associated with an enterprise. Machine learning may be used to understand context information associated with the user and to generate the menu options based on the context information, such as what accounts does the user have, what services does the user seek (e.g., new or existing product), where is the user located (e.g., out of the country, at an ATM, at a financial center, etc.), and so on.

FIG. 2 illustrates an example of a method 200 that may be performed by a wearable device 110, in accordance with certain embodiments. Method 200 begins at step 202 with presenting a first menu via a graphical user interface of a wearable device 110. The first menu comprises one or more first menu options. The one or more first menu options are associated with one or more data processing transactions available at a current location of the wearable device.

At step 204, method 200 determines an updated location of wearable device 110. As an example, in certain embodiments, wearable device 110 may include location capabilities, such as GPS capabilities, that facilitate determining the updated location of wearable device 110. In certain embodiments, wearable device 110 determines the updated location based at least in part on information received via network 105.

At step 206, method 200 obtains a second menu based on the updated location of wearable device 110. The second menu comprises one or more second menu options. The one or more second menu options are associated with one or more data processing transactions available at the updated location of wearable device 110. In this manner, wearable device 110 may dynamically update from the first menu to the second menu based on the updated location.

Wearable device 110 may obtain the second menu in any suitable manner. For example, in certain embodiments, wearable device 110 may retrieve the second menus (or one or more of the second menu options) from memory, wearable device 110 may generate the second menu (or one or more of the second menu options) using processing circuitry, and/or wearable device 110 may receive the second menu (or one or more of the second menu options) from server 120 via network 105.

In certain embodiments, wearable device 110 may obtain the second menu or one or more of the second menu options using a pre-defined shortcut. Certain pre-defined shortcuts may be defined by wearable device 110, for example, using machine learning. Certain pre-defined shortcuts may be received from server 120. For example, server 120 may obtain a pre-defined shortcut from the user (in cases where the user interacts with server 120 to pre-define the shortcut) or from a system administrator, and server 120 may provide the pre-defined shortcut to wearable device 110. As another example, server 120 may determine a pre-defined shortcut using machine learning and may provide the pre-defined shortcut to wearable device 110. In certain embodiments, the user interacts with wearable device 110 to configure a pre-defined shortcut. For example, the user may provide user input via an interface of wearable device 110, such as a touchscreen, in order to configure one or more pre-defined shortcut.

As described above, wearable device 110 may dynamically update from the first menu to the second menu based on the updated location. As an example, if at step 204 method 200 determined that the updated location of wearable device 110 is within a pre-determined proximity of a service site, at least one of the one or more second menu options may indicate services available at the service site. Suppose the service site is a financial center. Wearable device 110 may obtain second menu options indicating services available at the financial center in response to wearable device 110 moving within a pre-determined proximity of the financial center. The pre-determined proximity may indicate when wearable device 110 is located with the financial center or within a relatively short distance of the storefront, such as within 50 feet, 100 feet, or 200 feet. Examples of services available at the financial center may include opening a new account, making a payment from an existing account, making a withdrawal from an existing account, making a deposit to an existing account, and so on. Certain embodiments may customize the second menu options using customization information based on a user profile or a user pattern. As an example, certain embodiments customize the second menu options based on a user profile that indicates what types of accounts or relationships the user has with the financial center. As another example, certain embodiments, customize the second menu options based on a user history that indicates what types of financial transactions the user typically transacts at the financial center.

As another example, if at step 204 method 200 determined that the updated location of wearable device 110 is within a pre-determined proximity of an ATM, at least one of the one or more second menu options may indicate financial transactions available at the ATM. For example, in certain embodiments, the second menu may comprise at least two transaction amount options associated with the one or more data processing transactions available at the updated location of the wearable device. One of the second menu options may indicate a first transaction amount, such as an option to withdraw $20 from the ATM. Another of the second menu options may indicate a second transaction amount, such as an option to withdraw $40 from the ATM. Wearable device 110 may facilitate authenticating the user and determining the financial transaction that the user opts to transact with the ATM in order to streamline the user interactions with the ATM itself.

As another example, in certain embodiments, if at step 204 method 200 determined that the updated location of wearable device 110 is outside of a home area associated with the user, the second menu may add security-related menu options. The home area associated with the user may be defined in any suitable manner, such as based on a pre-determined distance from the user's home or based on geopolitical boundaries (e.g., the second menu may implement certain security measures if wearable device 110 is outside of the user's home country). An example of security measures may include removing certain menu options. Suppose that the first menu corresponds to a location within the user's home country, and the second menu corresponds to a location outside the user's home country. Wearable device 110 may remove at least one of the one or more first menu options when providing the second menu (e.g., wearable device 110 may remove first men options associated with data processing transactions that are no longer available at the updated location of wearable device 110). For example, wearable device 110 may remove a menu option to open a new account or a menu option to make a financial transaction over a pre-determined amount when outside of the user's home country.

Certain embodiments may include menu options to override such additional security measures. For example, certain embodiments may notify the user that the out-of-country security measures have been implemented and may present an option to disable the out-of-country security measures. Certain embodiments may require the user to pass stricter authentication requirements (e.g., one or more additional authentication factors, confidence level associated with biometric data exceeds a threshold, etc.) in order to disable the out-of-country security measures.

More generally, certain embodiment determine one or more authentication factors for authenticating the at least one of the data processing transactions available at the updated location. The one or more authentication factors may be determined based at least in part on the updated location of the wearable device. The one or more authentication factors may be determined based at least in part on other information. As an example, the one or more authentication factors may be based on the type of data processing transaction such that certain types of data processing transactions (e.g., opening a new account or making a payment over a certain dollar amount) may require authenticating more authentication factors than other types of data processing transactions (e.g., making a payment less than a certain dollar amount). As another example, the one or more authentication factors may be based on the type of wearable device 110 such that certain types of wearable devices 110 (e.g., legacy model wearable devices with less sophisticated biometric data sensors) may require authenticating more authentication factors than other types of wearable devices (e.g., newer model wearable devices with more sophisticated biometric data sensors). As another example, the one or more authentication factors may be based on a confidence level that wearable device 110 associates with its identification of the user (e.g., a lower confidence level may require authenticating more authentication factors than a high confidence level).

Method 200 proceeds to step 208 with presenting the second menu via the graphical user interface of the wearable device. Wearable device 110 may then receive user input indicating a selection of at least one of the one or more second menu options, as shown in step 210. At step 212, method 200 comprises facilitating at least one of the data processing transactions available at the updated location of the wearable device based on the selection indicated by the user input of step 210. As an example, wearable device 110 may send server 120 a request to transact a financial transaction or to set up an appointment with a service representative.

Certain embodiments may continue to dynamically update the menu as wearable device 110 updates its location. As an example, when wearable device 110 is no longer within the pre-determined proximity of the service site, wearable device 110 may remove menu options associated with using the service site. As another example, when wearable device 110 is no longer within the pre-determined proximity of the ATM, wearable device 110 may remove menu options associated with using the ATM.

As discussed above, in certain embodiments, the second menu is based at least in part on the customization information. The customization information is based on a user profile or a user pattern. As one example, the user profile may indicate that the user has received a new bill, or the user pattern may indicate that the user has a recurring payment coming up. In response, the second menu may notify the user of the new bill or the upcoming recurring payment and provide the user with simplified menu option to proceed with paying the new bill or the upcoming recurring payment.

In certain embodiments, customization information may be received from server 120 or determined by wearable device 110 based at least in part on information received from server 120. In certain embodiments, server 120 and/or wearable device 110 may use machine learning to determine customization information used to dynamically update the menu options. In certain embodiments, machine learning may indicate that certain menu options do not apply to the user. In response, wearable device 110 may update the menus to remove the menu options that do not apply to the user. As an example, if machine learning indicates that the user has closed a financial account, wearable device 110 may update the menus by removing options to transact payments via the closed financial account. In certain embodiments, machine learning may determine customization information based on a user profile (e.g., accounts, products, or services associated the user or other user information) or user patterns (e.g., user history, user habits, etc.) so that wearable device 110 presents the menu options with a relatively high likelihood of being selected by the user. For example, the machine learning may determine that the user frequently uses a credit card and seldom uses a checking account. Based on this determination, wearable device 110 may prioritize credit card-related menu options.

As described above, certain embodiments use one or more pre-defined shortcuts to obtain the second menu. In certain embodiments, wearable device 110 receives user input configuring a pre-defined shortcut for automating at least one of the data processing transactions available at the updated location of the wearable device. As an example, the user input may configure a pre-defined shortcut (such as a hotkey) for responding to bill pay notifications. The pre-defined shortcut may provide an option to proceed with automatically paying the bill. The second menu based on the pre-defined shortcut may be presented in response to a bill pay notification that wearable device 110 receives from server 120, detects in the user's email inbox, or otherwise obtains.

Certain embodiments may include menu options that alert a user in response to detecting a request for an unexpected data processing transaction has occurred. As an example, wearable device 110 may receive an alert from server 120. The alert may indicate that server 120 received a request for an unexpected data processing transaction. Certain embodiments determine that a requested data processing transaction is unexpected if the requested data processing transaction is associated with an unexpected location. For example, if the request for the data processing transaction originated from a location that does not match the updated location of wearable device 110 and/or does not match a pre-authorized location (such as the user's home area or the user's planned travel area), the location may be considered unexpected. Wearable device 110 may present the alert via the graphical user interface of the wearable device. The alert may include menu options allowing the user to approve or decline the unexpected data processing transaction. Wearable device 110 may receive user input indicating whether the user approves the unexpected data processing transaction and may communicate the user input indicating whether the user approves the unexpected data processing transaction to server 120.

FIG. 3 illustrates an example of computing components 300, in accordance with certain embodiments. The computing components 300 may be used to implement any of the structures illustrated in FIG. 1, or one or more portions thereof, such as network 105, wearable device 110, and/or server 120. The computing components 300 may comprise any suitable hardware and/or software configured to perform the functionality described above. The computing components 300 may be implemented using shared hardware or separate hardware. In certain embodiments, computing components 300 may be distributed in a cloud network environment.

In certain embodiments, the components comprise one or more interface(s) 302, processing circuitry 304, and/or memory(ies) 306. In general, processing circuitry 304 controls the operation and administration of a structure by processing information received from memory 306 and/or interface 302. Memory 306 stores, either permanently or temporarily, data or other information processed by processing circuitry 304 or received from interface 302. Interface 302 receives input, sends output, processes the input and/or output and/or performs other suitable operations. An interface 302 may comprise hardware and/or software.

Examples of interfaces 302 include user interfaces, network interfaces, and internal interfaces. Examples of user interfaces include one or more graphical user interfaces (GUIs), buttons, microphones, speakers, cameras, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 304 to exchange information with or through a network. Internal interfaces receive and transmit information among internal components of a structure.

Processing circuitry 304 communicatively couples to interface(s) 302 and memory 306, and includes any hardware and/or software that operates to control and process information. Processing circuitry 304 may include a programmable logic device, a microcontroller, a microprocessor, any suitable processing device, or any suitable combination of the preceding. Processing circuitry 304 may execute logic stored in memory 306. The logic is configured to perform functionality described herein. In certain embodiments, the logic is configured to perform the method described with respect to FIG. 2.

Memory 306 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 306 may be local/integrated with the hardware used by processing circuitry 304 and/or remote/external to the hardware used by processing circuitry 304.

In certain embodiments, memory 306 may be operable to store a menu application. The menu application facilitates presenting one or more menus via a graphical user interface of wearable device 110. As an example, in certain embodiments, the menu application may obtain menu options associated with a menu and may format the menu options according to a format or structure compatible with the graphical user interface of wearable device 110. As another example, in certain embodiments, the menu application may determine one or more menus or menu options to present via the graphical user interface, for example, based on context information. In certain embodiments, the menu application may use machine learning to determine one or more menus or menu options to present via the graphical user interface. In certain embodiments, the menu application may determine one or more menus or menu options to present via the graphical user interface based on shortcut information, customization information, menu/menu option information, or other information obtained from server 120.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated.

Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A wearable device, the wearable device comprising: a memory operable to store one or more menus, each menu comprising one or more menu options;
  a processor operably coupled to a network interface and the memory, the processor configured to:
   present a first menu of the one or more menus via a graphical user interface of the wearable device, the first menu comprising one or more first menu options, the one or more first menu options associated with one or more data processing transactions available at a current location of the wearable device;
   determine an updated location of the wearable device;
   obtain a second menu of the one or more menus, the second menu associated with the updated location of the wearable device, the second menu comprising one or more second menu options, the one or more second menu options associated with one or more data processing transactions available at the updated location of the wearable device;
   receive user input configuring a pre-defined shortcut for automating at least one of the data processing transactions available at the updated location of the wearable device, wherein the pre-defined shortcut is associated with one or more conditions indicating when to apply the pre-defined shortcut, and wherein the pre-defined shortcut comprises one or more menu options added to the first menu when the pre-defined shortcut is applied;
   present the second menu via the graphical user interface of the wearable device, wherein the second menu is obtained using the pre-defined shortcut;
   receive user input indicating a selection of at least one of the one or more second menu options; and
   facilitate at least one of the data processing transactions available at the updated location of the wearable device based on the selection.

2. The wearable device of claim 1, wherein the second menu removes at least one of the one or more first menu options, the removed at least one of the one or more first menu options associated with one or more data processing transactions unavailable at the updated location of the wearable device.

3. The wearable device of claim 1, wherein the processor is further configured to:
  receive customization information from a server, the customization information based on a user profile or a user pattern;
  wherein the second menu is based at least in part on the customization information.

4. The wearable device of claim 1, wherein the processor is further configured to:
  dynamically update at least one of the one or more menus stored in the memory based on an update to a user profile or a user pattern.

5. The wearable device of claim 1, wherein the processor is further configured to:
  determine one or more authentication factors for authenticating the at least one of the data processing transactions available at the updated location, the one or more authentication factors determined based at least in part on the updated location of the wearable device.

6. The wearable device of claim 1, wherein the updated location is within a pre-determined proximity of a service site and at least one of the one or more second menu options indicates services available at the service site.

7. The wearable device of claim 1, wherein the second menu comprises at least two transaction amount options associated with the one or more data processing transactions available at the updated location of the wearable device.

8. The wearable device of claim 1, wherein the processor is further configured to:
  receive an alert from a server, the alert indicating that the server received a request for an unexpected data processing transaction, the unexpected data processing transaction associated with an unexpected location;
  present the alert via the graphical user interface of the wearable device;
  receive user input indicating whether the user approves the unexpected data processing transaction; and
  communicate the user input indicating whether the user approves the unexpected data processing transaction to the server.

9. A method for use in a wearable device, the method comprising:
  presenting a first menu via a graphical user interface of the wearable device, the first menu comprising one or more first menu options, the one or more first menu options associated with one or more data processing transactions available at a current location of the wearable device;
  determining an updated location of the wearable device;
  obtaining a second menu based on the updated location of the wearable device, the second menu comprising one or more second menu options, the one or more second menu options associated with one or more data processing transactions available at the updated location of the wearable device;
  receiving user input confturin2 a pre-defined shortcut for automating at least one of the data processing transactions available at the updated location of the wearable device, wherein the pre-defined shortcut is associated with one or more conditions indicating when to apply the pre- defined shortcut, and wherein the pre-defined shortcut comprises one or more menu options added to the first menu when the pre-defined shortcut is applied;
  presenting the second menu via the graphical user interface of the wearable device, wherein the second menu is obtained using the pre-defined shortcut;
  receiving user input indicating a selection of at least one of the one or more second menu options; and
  facilitating at least one of the data processing transactions available at the updated location of the wearable device based on the selection.

10. The method of claim 9, further comprising:
  receiving customization information from a server, the customization information based on a user profile or a user pattern;
  wherein the second menu is based at least in part on the customization information.

11. A non-transitory computer readable medium comprising logic that, when executed by processing circuitry, causes the processing circuitry to perform actions comprising:
  presenting a first menu via a graphical user interface of a wearable device, the first menu comprising one or more first menu options, the one or more first menu options associated with one or more data processing transactions available at a current location of the wearable device;
  determining an updated location of the wearable device;

obtaining a second menu based on the updated location of the wearable device, the second menu comprising one or more second menu options, the one or more second menu options associated with one or more data processing transactions available at the updated location of the wearable device;

receiving user input confiurin2 a pre-defined shortcut for automating at least one of the data processing transactions available at the updated location of the wearable device, wherein the pre-defined shortcut is associated with one or more conditions indicating when to apply the pre- defined shortcut, and wherein the pre-defined shortcut comprises one or more menu options added to the first menu when the pre-defined shortcut is applied;

presenting the second menu via the graphical user interface of the wearable device, wherein the second menu is obtained using the pre-defined shortcut;

receiving user input indicating a selection of at least one of the one or more second menu options; and facilitating at least one of the data processing transactions available at the updated location of the wearable device based on the selection.

12. The non-transitory computer readable medium of claim 11, wherein the second menu removes at least one of the one or more first menu options, the removed at least one of the one or more first menu options associated with one or more data processing transactions unavailable at the updated location of the wearable device.

13. The non-transitory computer readable medium of claim 11, the actions further comprising:

receiving customization information from a server, the customization information based on a user profile or a user pattern;

wherein the second menu is based at least in part on the customization information.

14. The non-transitory computer readable medium of claim 11, the actions further comprising:

determining one or more authentication factors for authenticating the at least one of the data processing transactions available at the updated location, the one or more authentication factors determined based at least in part on the updated location of the wearable device.

15. The non-transitory computer readable medium of claim 11, wherein the updated location is within a predetermined proximity of a service site and at least one of the one or more second menu options indicates services available at the service site.

16. The non-transitory computer readable medium of claim 11, wherein the second menu comprises at least two transaction amount options associated with the one or more data processing transactions available at the updated location of the wearable device.

17. The non-transitory computer readable medium of claim 11, the actions further comprising:

receiving an alert from a server, the alert indicating that the server received a request for an unexpected data processing transaction, the unexpected data processing transaction associated with an unexpected location;

presenting the alert via the graphical user interface of the wearable device;

receiving user input indicating whether the user approves the unexpected data processing transaction; and communicating the user input indicating whether the user approves the unexpected data processing transaction to the server.

* * * * *